UNITED STATES PATENT OFFICE.

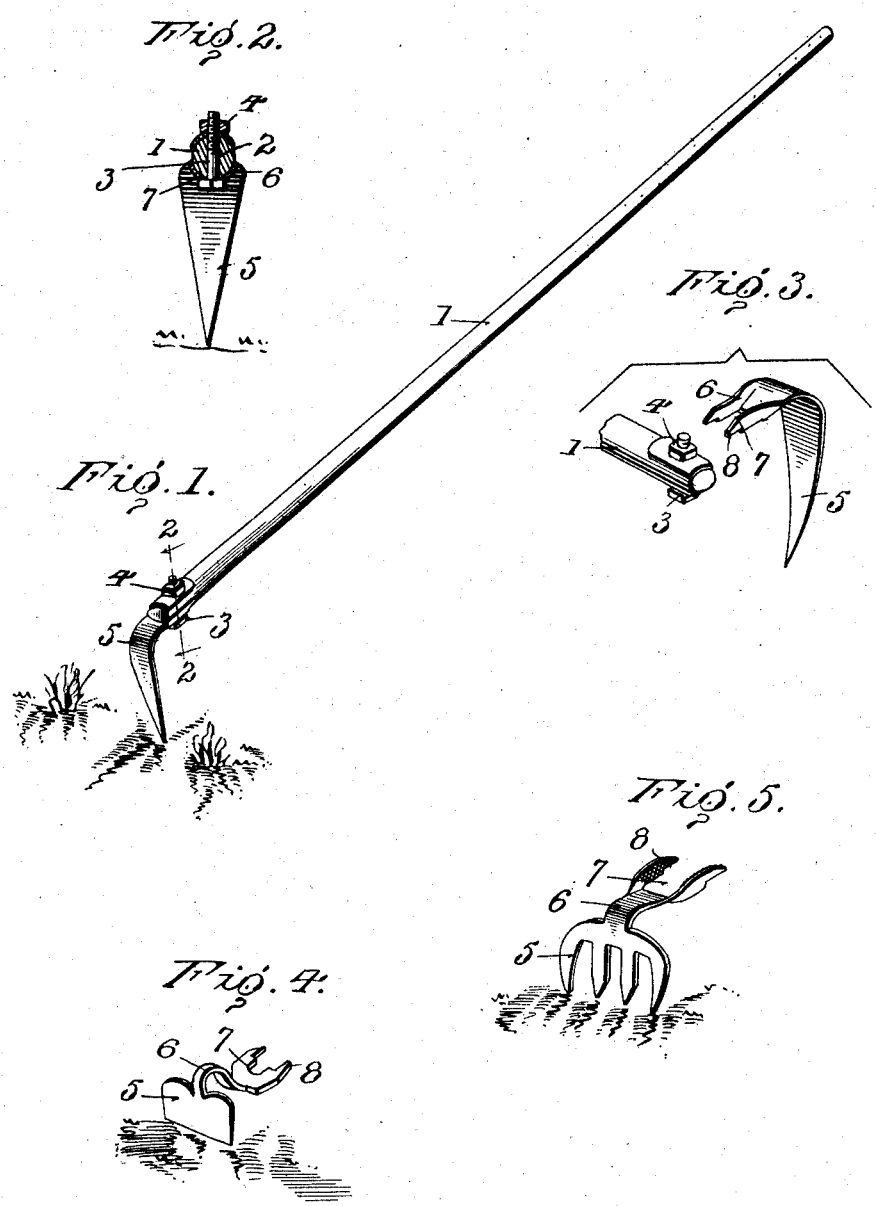

PRESTON G. GESFORD, OF ORTING, WASHINGTON.

GARDEN IMPLEMENT.

No. 907,333.      Specification of Letters Patent.      Patented Dec. 22, 1908.

Application filed September 5, 1908. Serial No. 451,830.

*To all whom it may concern:*

Be it known that I, PRESTON G. GESFORD, citizen of the United States, residing at Orting, in the county of Pierce and State of Washington, have invented certain new and useful Improvements in Garden Implements, of which the following is a specification.

This invention comprehends certain new and useful improvements in garden implements of that type in which a plurality of tools are designed for connection to a common handle, and the object of the invention is an improved device of this character which embodies peculiar attaching means designed to secure the respective tools to the handle and susceptible of operation by any one of said tools so that one tool may be conveniently detached by another tool which it is desired to substitute therefor, and the change conveniently effected in the garden after the laborer has finished with one tool, without the necessity of employing a special device for this purpose, as the same would be liable to become lost or misplaced and thus subject the workman to a serious inconvenience.

With these and other objects in view that will more fully appear as the description proceeds, the invention consists of certain constructions, arrangements and combinations of the parts that I shall hereinafter fully describe and then point out the novel features thereof in the appended claims.

For a full understanding of the invention, reference is to be had to the following description and accompanying drawings, in which:

Figure 1 is a perspective view of a gardening implement constructed in accordance with my invention. Fig. 2 is a transverse section thereof on the line 2—2 of Fig. 1. Fig. 3 is a perspective view showing the lower end of the handle and a tool in juxtaposition, and Figs. 4 and 5 are perspective views of various tools arranged for use with my improved handle.

Corresponding and like parts are referred to in the following description and indicated in all the views of the drawings by the same reference characters.

In carrying out my invention, I provide a handle 1 which may be of any desired or approved construction or design, except that it is preferably round and of a length suitable for use with gardening tools and that it is formed at one end with a transverse opening 2. This handle is provided at said end with suitable attaching means for securing the respective tools in position, and which in the present instance comprises a bolt 3 that is mounted in the opening 2 with its threaded extremity projecting beyond the handle, as shown, and carrying a nut 4, a washer being preferably interposed between the nut and the handle to prevent the former from abrading or otherwise injuring the latter when screwed up into position.

5 designates a plurality of tools, such as hoes, rakes or the like, which may be of any desired construction or design except as hereinafter noted, and each of which is formed with a shank 6 that is preferably bent to fit snugly against and conform to the shape of the handle, as shown. The shank 6 of each tool is formed with a longitudinally disposed slot 7 that is preferably of less width than the head of the bolt 3 and that leads from the end of the shank and has its portion adjacent thereto enlarged, as indicated at 8, so as to conform to the size and shape of the nut 4 and be adapted for engagement therewith to render each of the tools susceptible of use as a wrench to regulate the position of the nut 4 upon the bolt.

In the practical use of my improved gardening implement, one of the tools, say the hoe, is attached to the handle 1 by interposing its shank 6 between the latter and the head of the bolt 3, with the bolt received in the narrower portion 7 of the slot. The enlarged portion 8 of one of the other tools is then engaged with the nut 4 and the latter is screwed up against the handle to sustain the hoe securely in position, while the latter is desired for use. Assume for the purpose of illustration, that the workman has finished with the hoe and desires to continue the gardening by using, say a rake. The large portion 8 of the slot 7 of the rake is then engaged with the nut 4 to loosen the same upon the bolt and effect the convenient detachment of the hoe, the rake being then substituted therefor and the hoe being employed to operate the attaching means to secure the rake in position.

From the above description in connection with the accompanying drawing, it will be apparent that I have provided a simple, durable and efficient construction of gardening implement in which a plurality of tools may be readily secured to or detached from a common handle without the necessity of employing a special device for this purpose and which consists of comparatively few parts that may be easily and cheaply manufactured and readily assembled.

It is to be understood that the shanks 6 of the various tools are roughened on the inside so as to properly grip the handle, and it is also to be understood that the handle can be used in connection with a window cleaner or scrubber, as a pruning hook or for various other purposes, and wing nuts can also be used.

Having thus described the invention, what is claimed as new is:

1. An implement comprising a handle provided at one end with attaching means, and a plurality of tools each adapted to operate the attaching means and any selected one of which is designed to be secured thereby to the handle.

2. An implement comprising a handle formed at one end with a transverse opening extending therethrough, a bolt mounted in the opening with its extremity projecting beyond the handle, a nut working upon the extremity of the bolt, and a plurality of tools provided with shanks adapted to be interposed between the handle and the head of the bolt and formed with longitudinally disposed slots leading from one end of the shank and designed to receive the bolt, the slot in each shank being enlarged near the extremity thereof to conform to the size and shape of the nut, as and for the purpose specified.

3. An implement comprising a handle provided with an attaching bolt and a nut working thereon, and a plurality of tools each adapted to fit the nut to operate the same, and any selected one of which is designed to be secured by the bolt and the nut to the handle.

In testimony whereof I affix my signature in presence of two witnesses.

PRESTON G. GESFORD. [L. S.]

Witnesses:
   Z. L. KING,
   L. L. ROWE.